United States Patent [19]
Jackson

[11] Patent Number: 5,040,304
[45] Date of Patent: Aug. 20, 1991

[54] LOCATING DEVICE USED WITH ELECTRICAL OUTLET BOXES AND THE LIKE

[76] Inventor: Christopher A. Jackson, 11827 Amethyst Ct., Fountain Valley, Calif. 92708

[21] Appl. No.: 515,590

[22] Filed: Apr. 27, 1990

Related U.S. Application Data

[63] Continuation-in-part of Ser. No. 305,380, Feb. 1, 1989, abandoned, which is a continuation-in-part of Ser. No. 17,931, Feb. 24, 1987, Pat. No. 4,802,284.

[51] Int. Cl.⁵ .............................................. G01B 5/14
[52] U.S. Cl. ................................. 33/528; 33/DIG. 10
[58] Field of Search ................. 33/528, DIG. 10, 613

[56] References Cited

U.S. PATENT DOCUMENTS

| | | | |
|---|---|---|---|
| 3,823,754 | 7/1974 | Nix | 33/DIG. 10 X |
| 4,059,905 | 11/1977 | Wieting | 33/DIG. 10 X |
| 4,087,913 | 5/1978 | Jackson | 33/DIG. 10 X |
| 4,209,103 | 6/1980 | Glovier | 33/DIG. 10 X |

Primary Examiner—Harry N. Haroian
Attorney, Agent, or Firm—Plante, Strauss, Vanderburgh and Connors

[57] ABSTRACT

Disclosed is a device for locating the open side of an electrical outlet box comprising a flat locater plate having a pair of positioning pins extending outwardly from one side of the plate and a pair of template alignment pins extending outwardly from the other side of the plate. The template alignment pins are offset inwardly from the marginal edges of the locater plate to allow for clearance.

10 Claims, 6 Drawing Sheets

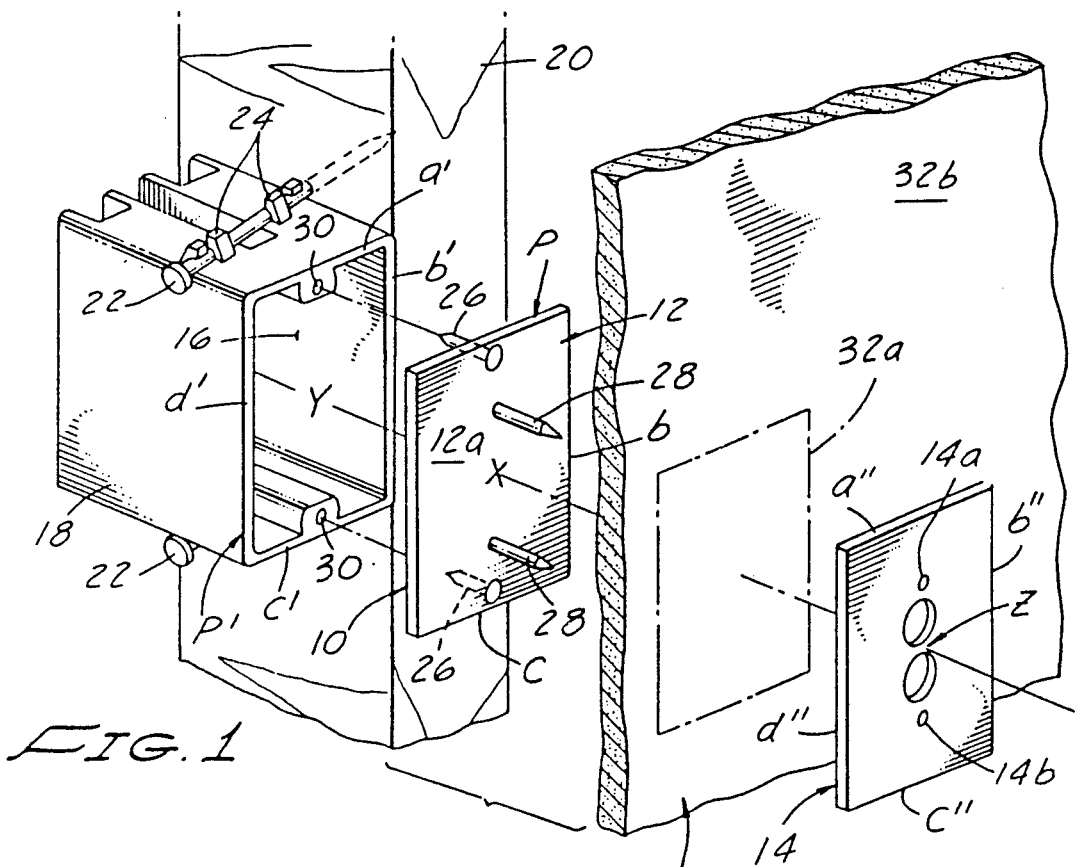
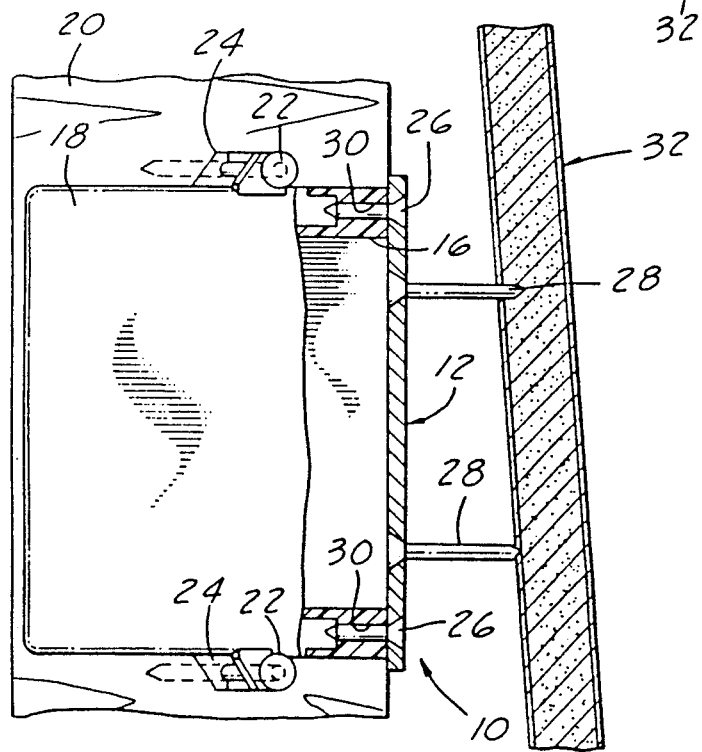
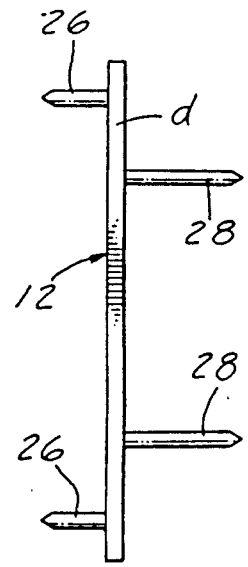
FIG.1
FIG.2
FIG.7

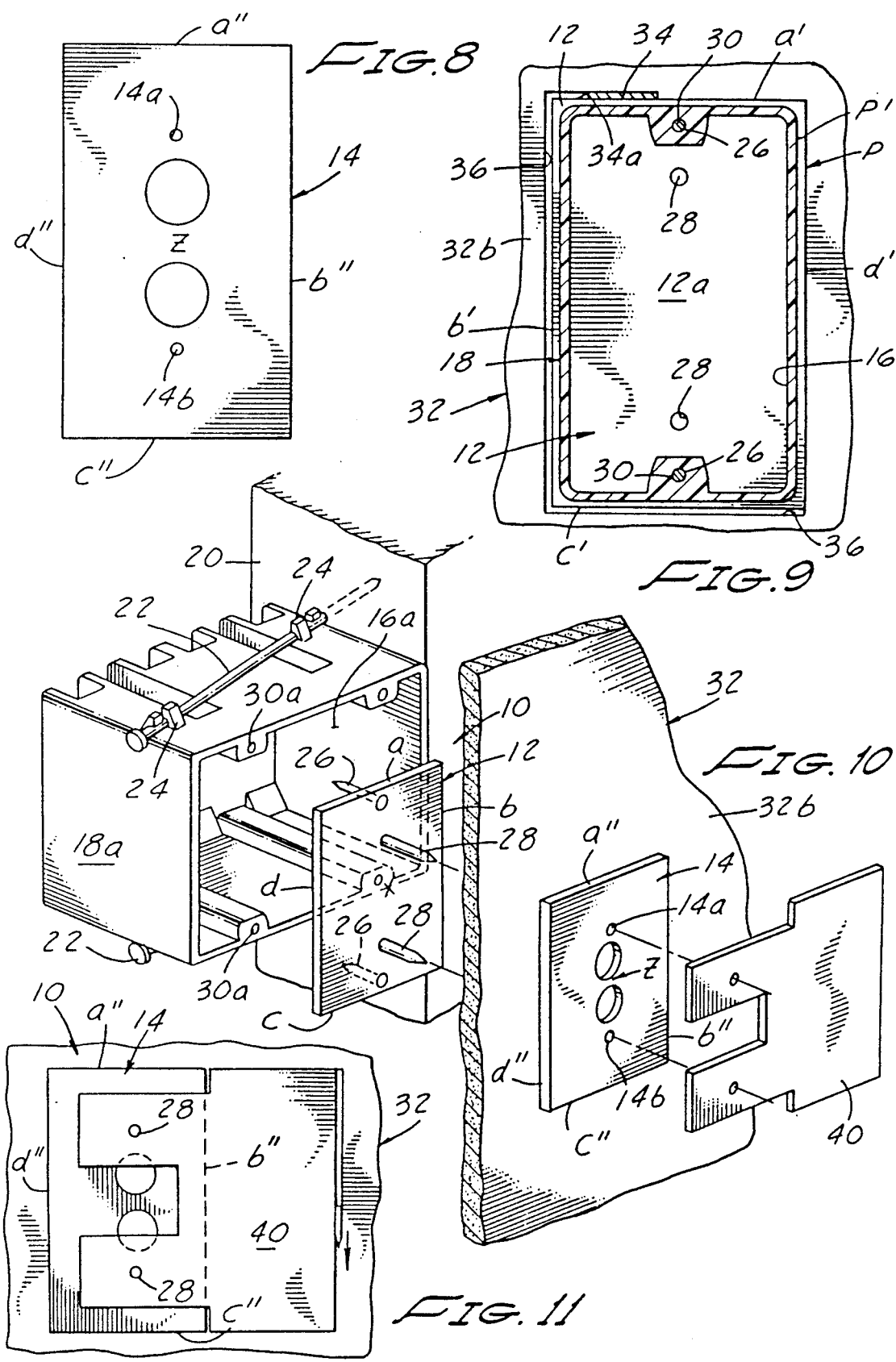

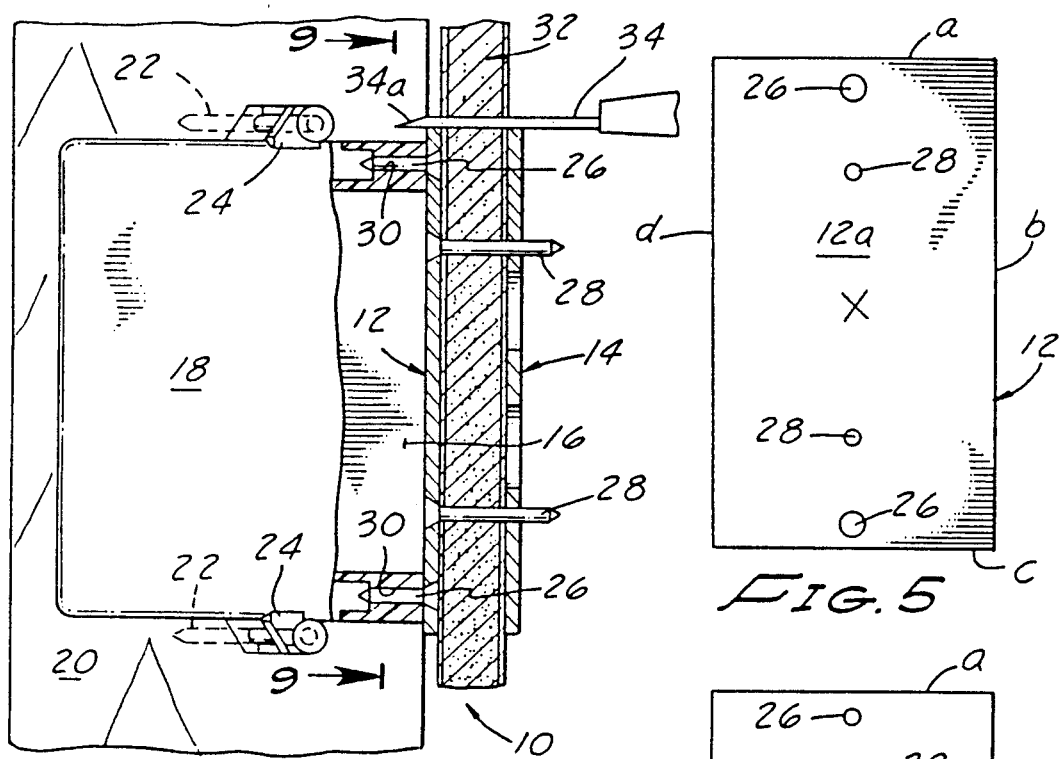
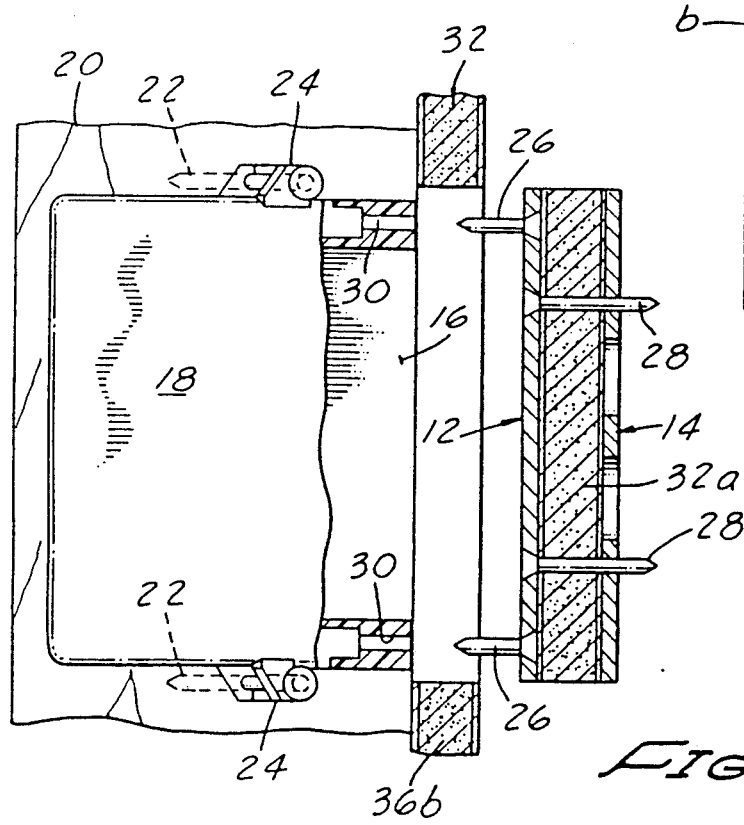

LOCATING DEVICE USED WITH ELECTRICAL OUTLET BOXES AND THE LIKE

RELATED PATENT APPLICATIONS

This patent application is a continuation-in-part application of U.S. patent application Ser. No. 07/305,380, filed Feb. 1, 1989, and entitled Locating Device Used With Electrical Outlets And The Like, now abandoned which is a continuation-in-part application of U.S. patent application Ser. No. 07/017,931, filed Feb. 24, 1987, also entitled Locating Device Used With Electrical Outlet Boxes And The Like, now U.S. Pat. No. 4,802,284. Both of these prior U.S. Patent applications are incorporated herein by reference and made part of this application.

BACKGROUND OF THE INVENTION

1. Field of the Invention

This invention relates to a device for locating the open side of an electrical outlet box covered by a panel.

2. Background Discussion

Typical construction methods call for installing panels of sheet rock and the like on wooden or metal studs placed approximately sixteen inches apart. Prior to installation of the panels, electrical wiring is installed with the electrical outlet boxes nailed in the desired position to the wooden studs. It is necessary to cut away sections of the panel to provide access to the open sides of the electrical outlet boxes. This is done prior to installation of the panels. A great deal of skill is necessary in order to quickly and accurately make the necessary measurements and cut away the section panel in the precise location so that the cut away section is in exact registration with the open side of the electrical outlet box upon installation of the panel. In many instances this is not done, leaving a large gap between the perimeter of the open side of the outlet box and the perimeter of the cut away section. Building codes, however, require that the gap between the perimeter of the cut away section and the perimeter of the open side of the outlet box be maintained at a minimum. Oftentimes, panels are installed which fail to meet building codes, but the building inspectors frequently overlook these discrepancies because there is not suitable means for doing the job quickly and accurately. In some instances where this gap is very excessive, a fire hazard is created and results in an unsafe structure.

Although devices have been suggested that purport to solve this problem, none have been accepted by the construction industry because they have been to expensive, complex, or impractical. Some of these devices are illustrated in the following U.S. Pat. Nos. 2,775,812; 3,823,754; 4,059,905; 4,087,913; 4,202,388; and 4,209,103.

SUMMARY OF THE INVENTION

The problem discussed above has been eliminated by the present invention which provides a device for quickly and accurately cutting away a panel section so that when the panel is installed, the cut away section will be in exact registration with the open side of the electrical outlet box. Thus the gap between the perimeter of the cut away section and the perimeter of the open side of the outlet box will be at a minimum and within building code requirements. The device of this invention is inexpensive to manufacture and easy to use, saving a substantial amount of time in the installation of panels. It is estimated that when using the device of this invention in a typical construction environment, twice as many panels can be installed by unskilled labor as compared to conventional techniques. Thus substantial cost savings are realized using this invention.

There are several features of this invention, no single one of which is solely responsible for its desirable attributes. Without limiting the scope of this invention as expressed by the claims which follow, its more prominent features will now be discussed. After considering this discussion, and particularly after reading the section of the application entitled DESCRIPTION OF THE PREFERRED EMBODIMENTS, one will understand how the features of this invention provide the ease of panel installation, accuracy of registration and improved cost savings.

One feature of this device is the use of a locater plate which, when placed in position over the open side of the outlet box, has overlapping marginal edges which extend slightly beyond the perimeter of the open side of the box. As will be explained in greater detail subsequently, when a cutting tool follows the edge of the locating plate, it cuts away an underlying panel section, with the cut away section having a perimeter just slightly greater than the perimeter of the open side of the outlet box. Thus there is a gap between the perimeter of the open side and the perimeter of the cut away section which is maintained at a minimum and within the building code requirements of the locale where the device is used. Typically this gap will range between ⅛ of an inch and 1/16 of an inch.

A second feature of this invention is that the locater plate has two sets of pins: one set extending inwardly toward the open side of the outlet box (the positioning pins) and the other set extending outwardly away from the open side pf the outlet box (the template alignment pins). The inwardly projecting set of positioning pins are received in receptacles for fasteners. These positioning pins bring the locater plate into registration with the open side of the outlet box so that the center of the locater plate is coincident with the center of the open side of the box. The set of template alignment pins serve as a guide for a template and also pierce the panel as it is being installed.

A third feature of this invention is that the template alignment pins are offset inwardly relative to the positioning pins to provide clearance so that the person installing the panel avoids scraping against the template alignment pins during installation of the panel. This is critical for the device to be practical. If the template alignment pins are not offset inwardly from the edge of the locater plate, the device cannot be used in a typical construction environment. The offset must be ¼ inch or more.

A forth feature of this invention is the use of a template which has dimensions slightly greater than the open side of the outlet box. Preferably there are holes in the template for receiving the template alignment pins. In accordance with this invention, with the marginal edges of the template aligned with coinciding edges of the open side of the box, the perimeter of the template slightly overlaps the perimeter of the open side. With the locater plate in position covering the open side of the outlet box, the panel is placed in position covering the box. The template alignment pins pierce the panel section which is to be cut away as the panel is moved to cover the box. With the template alignment pins extending through the panel section to be cut away, the template is placed into position on the template alignment pins by slipping the pins through the holes in the template. These holes are positioned so that when the template alignment pins pass through them, the template will be placed in registration with the open side of the box with its marginal edges overlapping the marginal edges of the open side.

With the locater plate, panel and template assembled together, the person installing the panel will now be able to cut away the section of the panel overlying the open side of the outlet box. This is accomplished by the use of a simple cutting tool which will pierce the panel, with the cutting edge of the tool being guided by the edges of the template and locater plate. The user simply moves the tool along a path defined by these edges, simultaneously cutting away the section of the panel overlying the open side of the outlet box. When he or she completes tracing a path that follows the perimeter of the template and locater plate, the cut away section will have been severed from the main body of the panel and can be removed by simply lifting the template and locater plate from the open side. The cut away section of the panel will be sandwiched between the locater plate and the template, with the template alignment pins serving as a site which the user can grasp for removal purposes.

The template could also be used as a guide for a pencil. The person installing the panel would simply trace a line around the template and remove the template. Later, using the line as a guide, the person would follow the line with the cutting tool. Drill-like rotary tools having a bit and brace are now commonly employed. The bit follows the edge of the locater plate. After gaining experience with using the locater plate, the use of the template may be entirely discontinued. The person would be able to estimate where the edge of the locater plate is relative to the template alignment pins and simply drill through the panel and bring the bit into contact with the edge of the locater plate, following this edge to cut away the section of panel covering the open side of the outlet box.

A fifth feature of this invention is that the pins are attached to the locater plate to provide a unitary type structure. This way of attaching the pins to the locater plate makes it virtually impossible to pull the pins from the plate. The pins shall be subjected to extreme forces and could be easily jarred loose from the locater plate if precautions were not taken to prevent this from happening. This type of attachment of pins to the plate must nevertheless be accomplished in an economical fashion so the device is inexpensive. One way to accomplish this is to provide a locater plate comprising front and rear members bonded together, with heads of the pins sandwiched between these members. Each of these members have openings therein, and each have internal surfaces which abut each other. The pins each include a head element and a shaft element. The shaft elements pass through the openings in the members with the head elements being sandwiched between these members. The members are brought together in a laminate-like fashion and subjected to pressure so that the heads of the pins deform the area of the members adjacent to the head elements to push the head elements into the members. As the head elements are pushed inwardly, they form the cavities within the members. The head elements are substantially flush with the abutting surfaces of the front and rear members. This unique construction ensures that the pins are connected securely to the locater plate and will not be jarred loose. This type of construction is suitable for medium size production runs. For larger production runs it becomes economical to use conventional die casting methods. Using such casting methods, the device is a unitary structure, with the pins and locater plate being all made of the same steel, which is caste and harden in accordance with well known techniques.

BRIEF DESCRIPTION OF THE DRAWING

The drawing, where like numerals indicate like parts, depicts the different embodiments of this invention. This drawing is for illustrative purposes only.

FIG. 1 is an exploded perspective view of the first embodiment of the device of this invention being used in the installation of a panel which covers an electrical outlet box.

FIG. 2 is a cross-sectional view of the locater plate in position covering the open side of the electrical outlet box shown in FIG. 1 with the panel being moved into position to cover the open side of the outlet box.

FIG. 3 is a side elevational view, with sections broken away, showing the template and locater plate in position over the open side of an electrical outlet box and the panel sandwiched between the locater plate and the template.

FIG. 4 is a side elevational view, with sections broken away, showing the cut away section of the panel being removed by simultaneously removing the locater plate and template.

FIG. 5 is a front plan view of the locater plate.

FIG. 6 is a rear plan view of the locater plate.

FIG. 7 is a side elevational view of the locater plate.

FIG. 8 is a plan view of the template.

FIG. 9 is a cross-sectional view taken along line 9—9 of FIG.

FIG. 10 is an exploded perspective view of the second embodiment of this invention used with a double size electrical outlet box.

FIG. 11 is a plan view of the second embodiment shown in FIG. with the template in position covering the section of the panel to be cut away.

DESCRIPTION OF PREFERRED EMBODIMENTS

Figure 12:
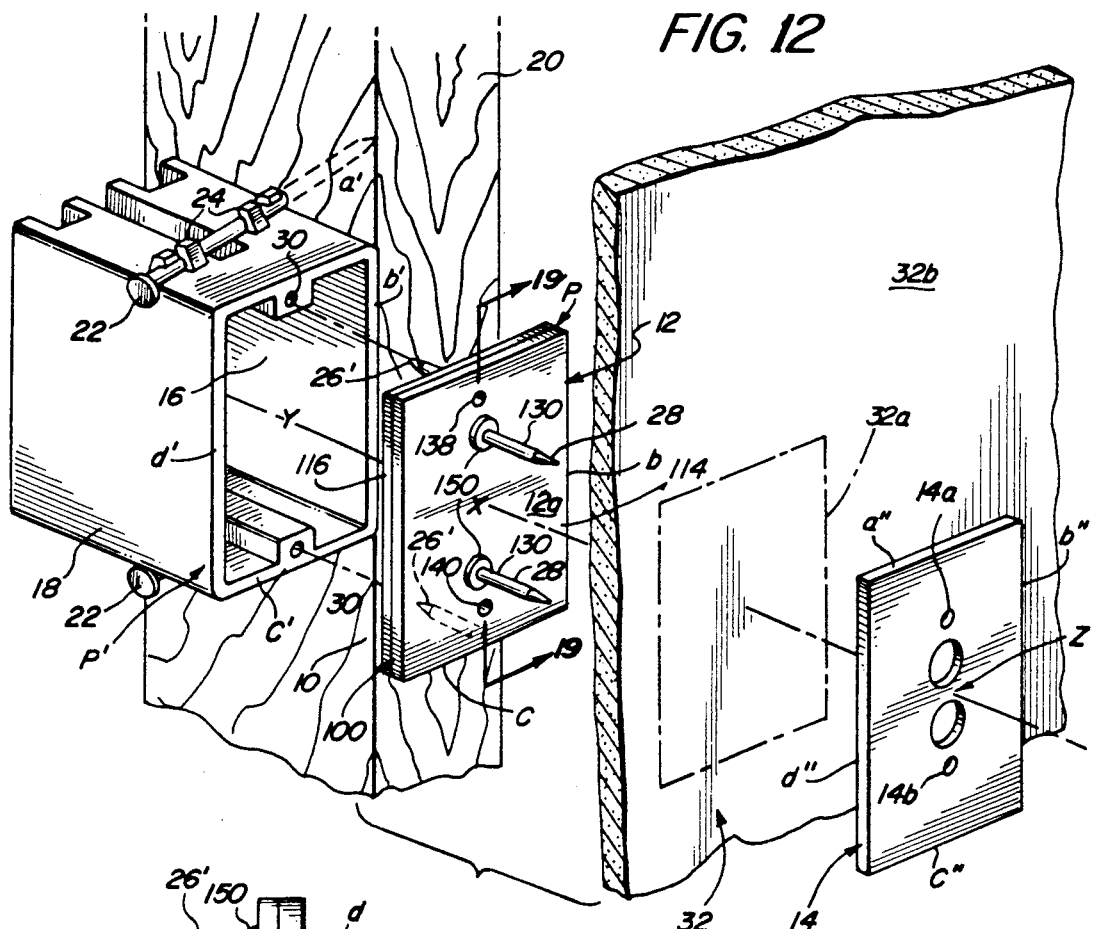
FIG. 12 is an exploded perspective view of the third embodiment of this invention being used in the installation of a panel which covers an electrical outlet.
Figure 13:
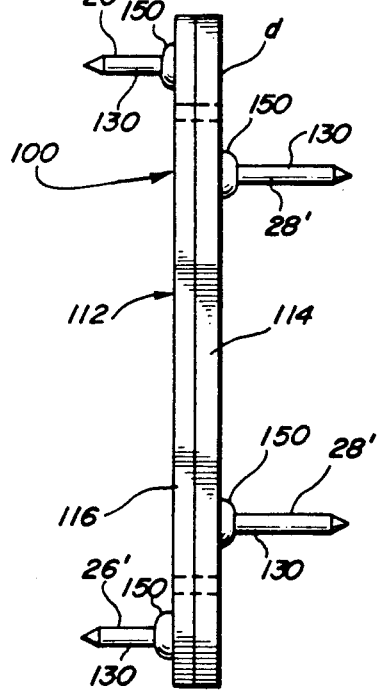
FIG. 13 is a side elevational view of the device shown in FIG. 12.

As best illustrated in FIG. 1, the device 10 of this invention includes a locater plate 12 and a template 14. As shown in FIGS. 5, 6, and 7, the locater plate 12 includes a flat metal member 12a having a configuration which conforms to the configuration of the open side 16 of the electrical outlet box 18. The outlet box 18 is attached to a stud 20 by means of nails 22 which are driven into the stud and guided by nail guides 24 which grip the nails and hold the box 18 in position. The metal member 12a in the example illustrated has a geometrical shape in the form of a rectangle, with each of the four edges a, b, c and d of the member 12a being approximately the same dimensions as the four edges a', b', c' and d' of the open side 16 of the box 18, but slightly greater than these dimensions of the open side.

A pair of positioning pins 26 extend outwardly from the rear side of the locater plate 12, and a pair of template alignment pins 28 extend outwardly from the front side of the locater plate. The positioning pins 26 are adapted to be received in opposed receptacles 30 in the open side 16 of the box 18, and are seated on the inside face of the metal member 12a in a position that will bring the center "x" of the locater plate 12 coincident with the center "y" of the open side 16 when the positioning pins are inserted into the receptacles. The receptacles 30 are also used to receive screws (not shown) for holding an electrical outlet (not shown) in position after panel installation.

The positioning pins 26 and alignment pins 28 are offset relative to each other to provide clearance for the hands of the installer of the panel or any tool being used, particularly the brace for the bit of a rotary cutting tool. Specifically, the alignment pins 28 are spaced inwardly $\frac{3}{4}$ inch or more from any any edge of the locater plate 12, typically from 3/4 to 1$\frac{1}{2}$ inches. Thus, while gripping a hand cutter, the installer's knuckles will not scrape against the pins 28, nor will the bit strike these pins when using a powered rotary cutting tool. When the locater plate 12 is positioned to cover the open side 16 of the electrical outlet box, the perimeter of the plate will overlap the perimeter of the open side 16. This overlap distance may, for example, correspond to the maximum gap allowed by the building code of the locale where the electrical outlet box is being installed. Typically this will range between about 1/16 and about $\frac{1}{8}$ of an inch.

As shown in FIG. 2, with the locater plate 12 in position, the template alignment pins 28 extend outwardly and pierce a panel 32 as it is being installed. When the panel 32 is placed in position flush against the front face of the locater plate 12 as illustrated in FIG. 3, the template alignment pins 28 pierce through the panel and extend outwardly, therefrom enabling the template 14 to be placed in position in registration with the locater plate. The template alignment pins 28 are long enough to pierce the panel 32 but do not extend more than about 1 inch from the panel when the panel is flush against the open side as illustrated an FIG. 3. The template alignment pins cannot be excessively long, otherwise they will interfere with panel installation, tend to band or snap off during panel installation, or rip the panel rather than piercing it.

As shown in FIG. 8, the template 14 is simply a flat metal plate having a pair of holes 14a and 13b spaced apart and located to accommodate the template alignment pins 28 when the template is placed in position. These holes 14a and 14b ensure that the marginal edges a", b", c" and d" of the template 14 will be coincident with the marginal edges a, b, c and d of the locater plate 12 and the center z of the template coincident with the center y of the open side 16 of the outlet box 18 and the center x of the locater plate.

As shown in FIGS. 3 and 9, with the locater plate 12 in position covering the open side 16 of the panel 32 sandwiched between the template 14 and the locater plate 12, the user will simply insert a cutting tool 34 through the panel with the cutting edge 34a of the tool abutting the marginal edges a, b, c and d of the locater plate 12 and the marginal edges a", b", c" and d" of the template 14, so that the user cuts away the section 32a of the panel 32 overlying the open side 16 of the box 18 with these edges guiding the tool. As the tool 34 is moved around these edges, the desired panel section removal is completed simply by grasping the needs of the template alignment pins 28 extending through the template 14 and pulling the assembly of the locater plate 12, cut away section of the 32a panel and template 14 away from the open side 16 of the electrical box 18 as illustrated in FIG. 4.

ALTERNATE EMBODIMENTS

FIGS. 10 and 11 illustrate the second embodiment of this invention, employing and extension piece 40 which is used when a large electrical box 18a is to be installed. Such electrical box 18a will have an open side 16a which is almost twice the area of the box illustrated in FIG. 1. The same locater plate 12 is employed as illustrated in FIG. 1 with this locater plate positioned in receptacle 30 a located to the left side of the enlarged box as viewed in FIG. 10. When the panel 32 is placed in position and the template alignment pins 28 pierce the panel, the template 14 is placed on these pins 28, and then the extension piece 40 is placed over the template as shown in FIG. 11. This combination of extension piece 40 and template 14 will define an area which corresponds to the open side 16a of the enlarged box 18. The cutting tool 34 is then employed to cut away the panel section underlying this area. When the cutting tool has traced a path around this area defined by the edges of the template 14 and the extension piece 40, the sandwich of the locater plate, panel cut away section, template and extension piece are removed, exposing the interior of the enlarged box.

Figure 14:
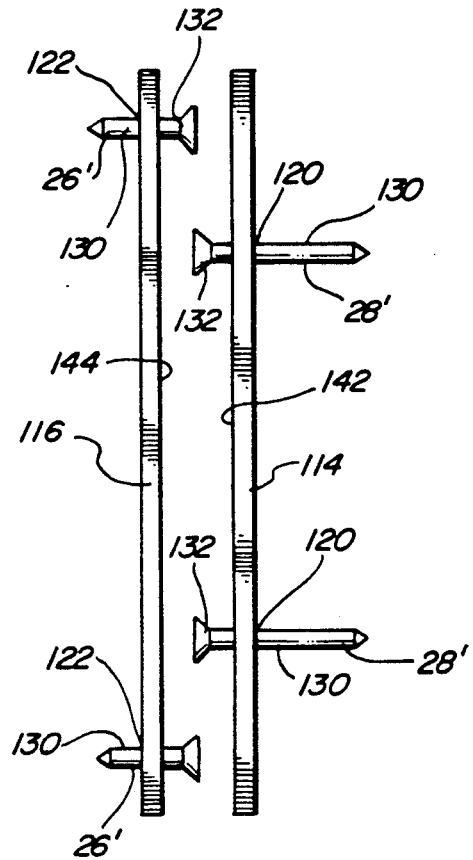
FIG. 14 is a side elevational view of an assemblage of pins and the front and rear members comprising the locater plate of the third embodiment of this invention.

FIGS. 12 through 19 illustrate the third embodiment of this invention, the device 100. This device 100 comprises a locater plate 112 having front and rear members 114 and 116, respectively. The rear member 116 has a configuration conforming to the configuration of the open side of the outlet box. The front member has the same configuration. The locater plate 112 may have slightly longer dimensions so that its marginal edges extend slightly beyond the perimeter of the open side 16. Each of these members 114 and 116 have openings 120 and 122, respectively, therein for receiving the pins 26' and 28' as best illustrated in FIG. 14. Each of the pins 26' and 28' include a shaft element 130 and a head element 132.

Figure 19:
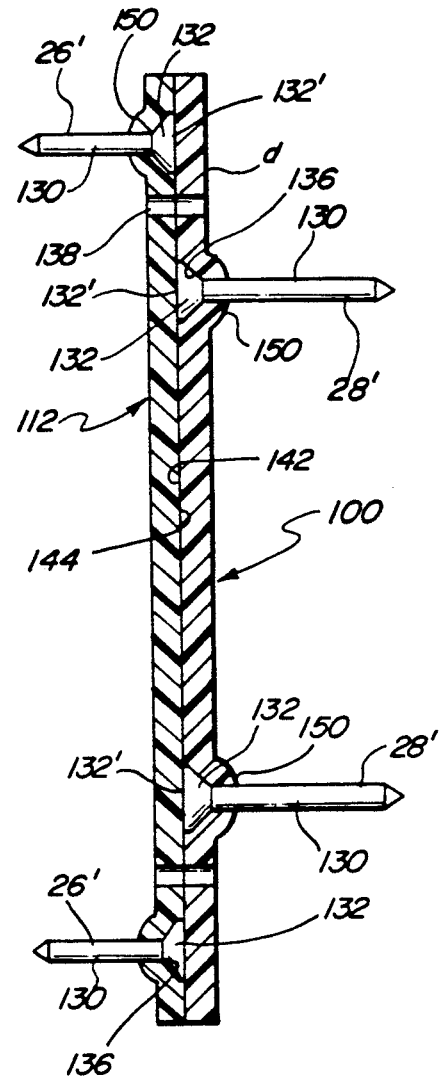
FIG. 19 is a cross-sectional view taken along line 19 19 of FIG. 12.

The front and rear members 114 and 116 are made of solid steel and have a thickness ranging between 1/32 and 1/16 of an inch. To construct the device 100 shown in FIG. 14, the shaft elements 130 are placed in the openings 120 and 122, and an assemblage of the members 114 and 116 and pins 26' and 28' are brought together and placed in a press so that this assemblage is subjected to substantial pressure. The pressure causes the area immediately adjacent to the head elements 132 to deform and create cavities 136 in which the head elements of the pins are lodged as shown in FIG. 19. The assemblage is then spot-welded, for example at points 138 and 140, to bond them securely together. The top surfaces 132' of the head elements 132 are flushed with the internal abutting surfaces 142 and 144 of the members 114 and 116, respectively, so that the total thickness of the locater plate 112 is less than about ⅛ of an inch. This is important. A very thick locater plate 112 is unsuitable. When the head elements 132 are pressed into the members 114 and 116, annular raised rims 150 surrounding the shaft elements 130 are formed. These rims 150 have a height of less than 1/16 inch, and do not interfere with the operation of the device 100.

The shaft elements 130 of the positioning pins 26' have a diameter from about 1/16 to about ⅛ inch and extend outwardly from the rear side of the locater plate from ¼ to ¾ inch. The shaft elements 130 of the template alignment pins have a diameter of 1/16 to ⅛ inch and extend outwardly from the front side of the locater plate from ¾ to 1½ inch.

The locater plate 112 thus is a solid steel structure which, when positioned on the outlet box 18, covers the open side 16 to prevent access. The template alignment pins 28' are displaced inwardly ¾ inch or more from any marginal edge of the locater plate 112. In the construction industry the current practice is to use rotary drill-like cutting tools which cut around the locater plate and template. This tool could accidentally be inserted through the open side of the outlet box 16 and cut electrical wires in the box. Because the locater plate 112 is solid, this tool cannot enter through the open side 16 into the interior of the outlet box. Because the template alignment pins 28' are displaced inwardly from the marginal edges, the brace holding the rotating bit has room to clear the template alignment pins 28'. And the positioning pins 26' and template alignment pins 28' are attached to the plate 112 in a manner that makes it virtually impossible to jar the pins loose, or otherwise dislodge them from the plate. The pins could snap off, but this is highly unlikely since they are made of steel. All of these features are important.

Figure 20:
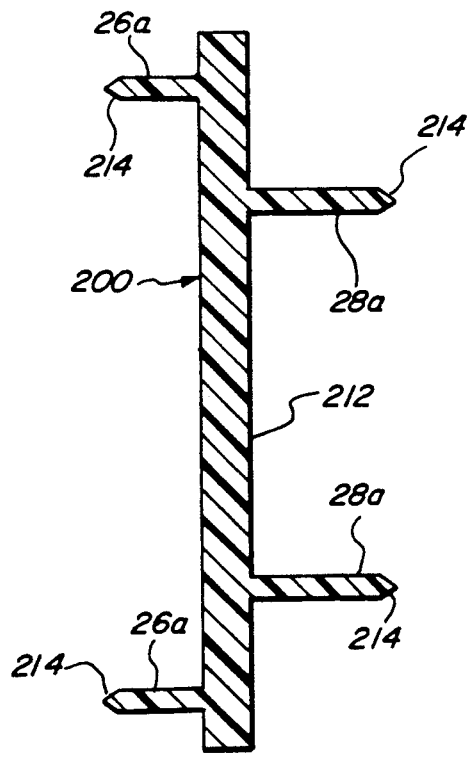
FIG. 20 is a cross-sectional view of the forth embodiment of this invention made using casting techniques to provide a one piece, solid structure.
Figure 15:
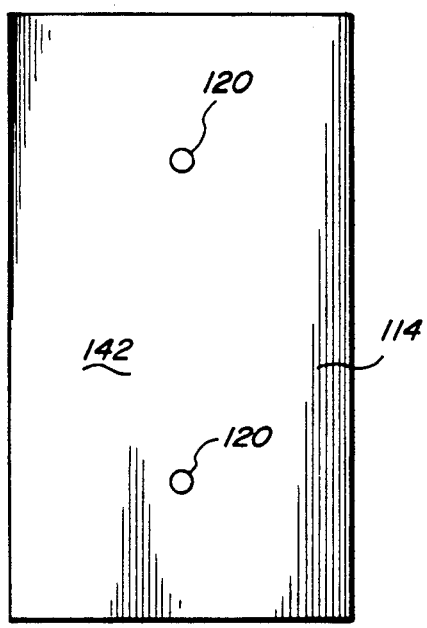
FIG. 15 is a plan view of the front member shown in FIG. 14.
Figure 16:
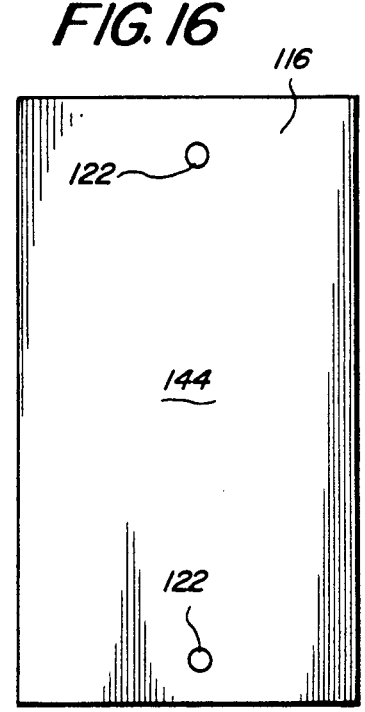
FIG. 16 is a plan view of the rear member shown in FIG. 14.
Figure 17:
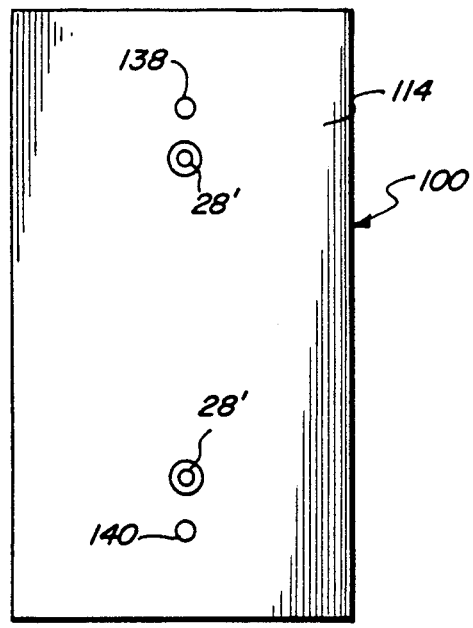
FIG. 17 is a plan view showing the front side of the third embodiment of this invention.
Figure 18:
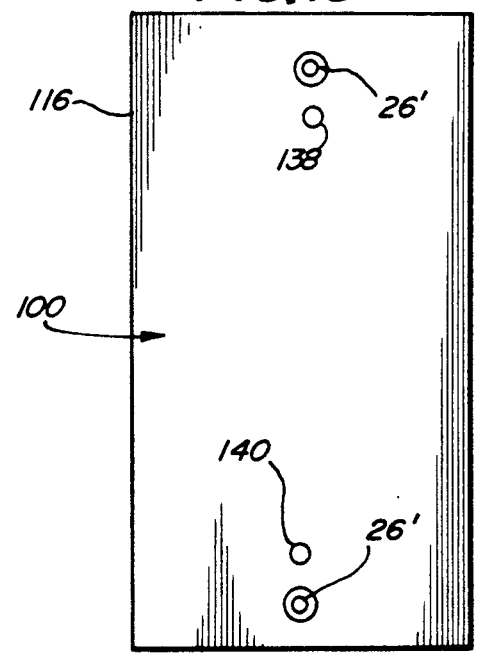
FIG. 18 is a plan view showing the rear side of the third embodiment of this invention.

The forth embodiment of this invention as shown in FIG. 20 is similar to the other embodiments, but it is a die cast, integral, one piece solid structure 200. This structure includes a locater plate 212 having a pair of positioning pins 26a and a pair of template alignment pins 28a. The positioning pins 26a, template alignment pins 28a, and locater plate 212 are formed form molten metal as it flows into a die during the casting process. Conventional die casting techniques are employed. Thus upon solidification of the metal a unity, solid piece structure 200 is formed. The template alignment pins 28a are displaced inwardly at least ¾ inch from the perimeter of the locater plate 212, and the tips 214 of both the template alignment pins and the positioning pins 26a are rounded. Rounding the tips 214 is desirable for safety. Such rounded tips 214 pierce sheet rock just as well, or even better, than tips with sharp points. The main advantage of the structure 200 is that, because it is an integral, one piece structure, the pins 26a and 28a cannot jar loose during use of the invention. Another advantage is, for large production runs, the structure 200 is less costly and easier to manufacture than the other embodiments which require assembling several components to make the invention.

SCOPE OF THE INVENTION

The above description presents the best mode contemplated for carrying out the present invention as depicted by the three embodiments disclosed. The combination of feature illustrated by these embodiments provide the simplicity, precision and cost savings of this invention. This invention, however, is susceptible to modifications and alternate constructions from the embodiments shown in the drawing and described above. Consequently, it is not the intention to limit it to the particular embodiments disclosed. On the contrary, the intention is to cover all modifications and alternate constructions falling within the scope of this invention as generally expressed by the following claims.

I claim:

1. A device for locating the open side of an electrical outlet box or the like during installation of a panel which covers said open side, said open side having a perimeter of a predetermined configuration and a center point, and said box having receptacle means along the perimeter which are adapted to receive fasteners, said device including a relatively thin, flat locater plate comprising a rear member and a front member bonded together, said members each having openings therein and each having internal surfaces which abut each other, said locater plate having a configuration conforming to the configuration of said open side of the outlet box, marginal edges, front and rear sides including a common center point, with said rear side abutting the perimeter of the box when the locater plate is placed in an overlying position, said locater plate when in said overlying position covering the open side to prevent access, a pair of positioning pins connected to the locater plate near the marginal edges, said positioning pins each having a head element which is wedged between said front and rear members and a shaft element passing through one of said openings in the rear member and extending outwardly from the rear side and being adapted to be received in the receptacle means and positioned to bring the center point of the locater plate into coincidence with the center point of said open side of the outlet box when the positioning pins are inserted into the receptacle means, and template alignment pin means connected to the locater plate and displaced inwardly from the marginal edges of the locater plate a distance which is sufficient to provide clearance so that a person installing the panel avoids scrapping against the template alignment pin means when cutting away a section of the panel overlying said open side, said template alignment pin means having a head element which is wedged between said front and rear members and a shaft element passing through an opening in the front member and extending outwardly from the front side of the locater plate.

2. The device of claim 1 wherein the predetermined configuration of said open side is rectangular.

3. The device of claim 1 wherein the template alignment pin means are displaced inwardly from any marginal edges of the locater plate ¾ of an inch or more.

4. The device of claim 1 wherein the shaft element of the template alignment pin means has a diameter of from 1/16 to ⅛ inch and the shaft extends outwardly from the front side from ¾ to 1½ inch.

5. The device of claim 1 wherein the shaft elements of the positioning pins have a diameter of from 1/16 to ⅛ inch and extend outwardly from the rear side from ¼ to ¾ inch.

6. The device of claim 1 wherein the front and rear members have a thickness of from 1/32 to 1/16 inch.

7. The device of claim 1 wherein the locater plate has a thickness which is less than ⅛ inch.

8. The device of claim 1 wherein the front and rear members are made of solid steel and are spot welded together.

9. The device of claim 1 wherein the front and rear members each have therein cavities which receive said head elements.

10. The device of claim 9 wherein said cavities are formed by subjecting an assemblage of the front and rear members and the pins and pin means to pressure so the head elements deform the area of the members adjacent the head elements to push the head elements into the members so that the head elements are substantially flush with the abutting surfaces of said front and rear members.

* * * * *